United States Patent
Chen et al.

(10) Patent No.: US 12,107,541 B2
(45) Date of Patent: Oct. 1, 2024

(54) OPTIMIZER, PHOTOVOLTAIC POWER GENERATION SYSTEM, AND IV CURVE SCANNING METHOD FOR PHOTOVOLTAIC MODULE

(71) Applicant: Huawei Digital Power Technologies Co., Ltd., Shenzhen (CN)

(72) Inventors: Dong Chen, Shanghai (CN); Lei Shi, Shanghai (CN); Zhaohui Wang, Nuremberg (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 17/404,407

(22) Filed: Aug. 17, 2021

(65) Prior Publication Data

US 2021/0376790 A1    Dec. 2, 2021

Related U.S. Application Data

(63) Continuation of application No. PCT/CN2020/094176, filed on Jun. 3, 2020.

(30) Foreign Application Priority Data

Sep. 23, 2019   (CN) .......................... 201910901754.7

(51) Int. Cl.
    *H02S 50/10*   (2014.01)
    *H02S 40/32*   (2014.01)
    *H02S 40/38*   (2014.01)

(52) U.S. Cl.
    CPC .............. *H02S 50/10* (2014.12); *H02S 40/32* (2014.12); *H02S 40/38* (2014.12)

(58) Field of Classification Search
    CPC ......... Y02E 10/56; H02S 50/10; H02S 40/32; H02S 40/38; H02J 2207/10; H02J 2300/24; H02J 3/381; H02J 7/35
    See application file for complete search history.

(56) References Cited

U.S. PATENT DOCUMENTS

| | | | |
|---|---|---|---|
| 2013/0092208 A1 | 4/2013 | Robbins | |
| 2013/0321432 A1* | 12/2013 | Burns | .................. G09G 3/3466 362/613 |

(Continued)

FOREIGN PATENT DOCUMENTS

| | | |
|---|---|---|
| CN | 104967406 A | 10/2015 |
| CN | 106712716 A | 5/2017 |

(Continued)

OTHER PUBLICATIONS

Japanese Office Action issued in corresponding Japanese Application No. 2021-552869, dated Aug. 30, 2022, pp. 1-7.

(Continued)

*Primary Examiner* — Neel D Shah
*Assistant Examiner* — Adam S Clarke
(74) *Attorney, Agent, or Firm* — HAUPTMAN HAM, LLP

(57) ABSTRACT

A photovoltaic power generation system includes a plurality of photovoltaic modules, a plurality of optimizers, and an inverter. Each optimizer is connected to at least one photovoltaic module, and output ends of the plurality of optimizers are connected in series to form a string and then connected to the inverter. The optimizer includes a conversion unit, and a control unit configured to control the conversion unit. The optimizer further includes an auxiliary power source, an energy storage unit, and a first unidirectional conduction unit that are connected between the conversion unit and the control unit. The control unit is configured to perform IV curve scanning for each voltage segment, where the voltage segments are obtained by segmenting a range of an output voltage of a photovoltaic module corresponding to the optimizer from an open-circuit voltage to a preset minimum voltage, and at least two voltage segments are obtained through division.

18 Claims, 8 Drawing Sheets

(56) References Cited

U.S. PATENT DOCUMENTS

| | | | |
|---|---|---|---|
| 2018/0226803 A1* | 8/2018 | Maki | G05F 1/67 |
| 2018/0234051 A1 | 8/2018 | Ni et al. | |
| 2020/0204111 A1* | 6/2020 | Zhao | H02S 50/00 |

FOREIGN PATENT DOCUMENTS

| | | |
|---|---|---|
| CN | 107196604 A | 9/2017 |
| CN | 107450646 A | 12/2017 |
| CN | 108418549 A | 8/2018 |
| CN | 108832893 A | 11/2018 |
| CN | 2019040434 A | 3/2019 |
| CN | 109818495 A | 5/2019 |
| CN | 109861644 A | 6/2019 |
| CN | 110677118 A | 1/2020 |
| JP | 2019161813 A | 9/2019 |

OTHER PUBLICATIONS

Qi Gao et al., "Effects of I-V Measurement Parameters on the Hysteresis Effect and Optimization in High-Capacitance PV Module Testing", IEEE Journal of Photovoltaics, vol. 8, No. 3, May 2018, total 9 pages.

European Search Report issued in corresponding European Application No. 20869537.9, dated Mar. 30, 2022, pp. 1-8.

International Search Report issued in corresponding International Application No. PCT/CN2020/094176, dated Aug. 21, 2020, pp. 1-11.

* cited by examiner

OPTIMIZER, PHOTOVOLTAIC POWER GENERATION SYSTEM, AND IV CURVE SCANNING METHOD FOR PHOTOVOLTAIC MODULE

CROSS-REFERENCE TO RELATED APPLICATIONS

This application is a continuation of International Application No. PCT/CN2020/094176, filed on Jun. 3, 2020, which claims priority to Chinese Patent Application No. 201910901754.7, filed on Sep. 23, 2019. The disclosures of the aforementioned applications are hereby incorporated by reference in their entireties.

BACKGROUND

An optimizer is a power conversion apparatus installed between a photovoltaic module and an inverter. The optimizer eliminates a series/parallel connection mismatch of the photovoltaic module and reduce a probability that the photovoltaic module is bypassed. The optimizer has an MPPT (Maximum Power Point Tracking, maximum power point tracking) function and an IV curve scanning function of a single photovoltaic module.

A photovoltaic power generation system performs online IV curve scanning on the photovoltaic module by using the optimizer, to detect the photovoltaic module to determine whether the photovoltaic module has a defect or damage. When performing the IV curve scanning, the optimizer needs to control an output voltage of the photovoltaic module to change from an open-circuit voltage to a relatively low voltage or even to 0 V, and obtain an output current value corresponding to each voltage, to obtain an entire IV curve. However, because an auxiliary power source of the optimizer generally is powered by the output voltage of the photovoltaic module, when the output voltage of the photovoltaic module is relatively low, the auxiliary power source of the optimizer is undervoltage, and the optimizer stops working. As a result, an entire IV curve scanning task cannot be completed.

In the prior art, generally, an energy storage circuit is connected in parallel to an input end of the auxiliary power source, and a unidirectional conduction circuit is connected in series to the input end before the energy storage circuit, so that when the output voltage of the photovoltaic module is relatively low, the energy storage circuit continues to supply power to the auxiliary power source, to ensure that the optimizer completes the IV curve scanning task. However, because an IV curve scanning process needs to take a particular time to enable the output voltage of the photovoltaic module to change step by step according to a specified regularity, an energy storage circuit having a relatively high capacity is needed, to ensure that the optimizer completes the IV curve scanning task. However, the energy storage circuit having a relatively high capacity does not facilitate an optimization design of a volume and costs of the optimizer.

SUMMARY

Embodiments of this application disclose an optimizer, a photovoltaic power generation system, and an IV curve scanning method for a photovoltaic module, to reduce a capacity of an energy storage circuit and reduce a power fluctuation of a photovoltaic string.

According to a first aspect, an embodiment of this application discloses an optimizer, including a conversion unit, a control unit, an auxiliary power source, an energy storage unit, and a first unidirectional conduction unit. The auxiliary power source, the energy storage unit, and the first unidirectional conduction unit are connected between the conversion unit and the control unit. An input end of the conversion unit is connected to at least one photovoltaic module, and the conversion unit is configured to perform power conversion on the connected photovoltaic module. The control unit is electrically connected to the conversion unit, and is configured to control the conversion unit. The auxiliary power source is configured to provide a working voltage for the control unit. The energy storage unit is configured to provide electric energy for the auxiliary power source or the control unit. The first unidirectional conduction unit is configured to prevent the electric energy of the energy storage unit from falling with a decrease of a voltage of the photovoltaic module. The control unit is further configured to perform IV curve scanning for voltage segments when determining that the optimizer needs to perform an IV curve scanning task, where the voltage segments are obtained by segmenting a range of an output voltage of the photovoltaic module corresponding to the optimizer from an open-circuit voltage to a preset minimum voltage, and at least two voltage segments are obtained through division.

The conversion unit is a converter, for example, a DC/DC converter. The control unit is an MCU (for example, a single-chip microcomputer). The auxiliary power source is a conversion circuit with complete functions, for example, a conversion circuit that converts an input voltage into 12 V or 5 V. The energy storage unit is an energy storage circuit including a capacitor, a supercapacitor, or a battery. The first unidirectional conduction unit is a unidirectional conduction circuit including at least one diode.

In the optimizer in this embodiment of this application, when determining that the optimizer needs to perform the IV curve scanning task, the control unit performs IV curve scanning for each voltage segment. The voltage segments are obtained by segmenting the range of the output voltage of the photovoltaic module corresponding to the optimizer from the open-circuit voltage to the preset minimum voltage, and at least two voltage segments are obtained through division. The optimizer is restarted when IV curve scanning is performed for a voltage segment with a relatively low voltage, so that the energy storage unit is recharged in this time period. In addition, the output voltage of the photovoltaic module is adjusted to the current voltage segment. Therefore, an entire IV curve scanning task is completed by using an energy storage unit having a relatively low capacity, thereby reducing costs and a volume of the optimizer.

In an implementation, when receiving an IV curve scanning instruction sent by a host computer, the control unit determines that the optimizer needs to perform the IV curve scanning task, that is, the IV curve scanning task is performed when there is a determination that there is a user demand. In this way, the user demand is better satisfied.

In an implementation, when performing IV curve scanning for each voltage segment, the control unit adjusts the output voltage of the photovoltaic module to a voltage of one of two endpoints of the voltage segment by using the conversion unit. There is an intersection between two adjacent voltage segments. In this way, entire and continuous IV curve scanning for the range from the open-circuit voltage to the preset minimum voltage is implemented.

In an implementation, two endpoints of a voltage segment are respectively the open-circuit voltage and a threshold voltage of the photovoltaic module, and the voltage segment is a first voltage segment. The threshold voltage of the photovoltaic module is less than a minimum voltage needed by the auxiliary power source for working, and a range from the threshold voltage of the photovoltaic module to the preset minimum voltage is divided into at least two voltage segments. In this way, the entire IV curve scanning is implemented by using an energy storage unit having a relatively low capacity, to help to reduce a volume and costs of the optimizer.

The minimum voltage needed by the auxiliary power source for working is a minimum output voltage that is output by the photovoltaic module and that ensures normal working of the auxiliary power source. The minimum output voltage of the photovoltaic module is directly provided for the auxiliary power source for normal working, or is converted (for example, increased or decreased) before being provided for the auxiliary power source for normal working. That the threshold voltage of the photovoltaic module is less than the minimum voltage needed by the auxiliary power source for working means that a voltage difference between the threshold voltage of the photovoltaic module and the minimum voltage needed by the auxiliary power source for working falls within a preset range, and the preset range depends on energy that is provided by the energy storage unit. To be specific, the preset range is a voltage decrease range of the photovoltaic module in a scenario in which the energy storage unit continues to supply power when an output of the photovoltaic module is less than the minimum output voltage that ensures normal working of the auxiliary power source.

In an implementation, the first voltage segment is divided into at least two voltage segments. In this way, when a plurality of optimizers perform IV curve scanning at the same time, a fluctuation of a total output power is relatively small.

In an implementation, to ensure that the optimizer completes the IV curve scanning task when the output voltage of the photovoltaic module is less than a minimum voltage needed by the auxiliary power source for working, the auxiliary power source is electrically connected to the control unit; the energy storage unit is connected in parallel to an input end of the auxiliary power source; and the first unidirectional conduction unit is connected in series between the input end of the conversion unit and the energy storage unit, or the first unidirectional conduction unit is connected in series between an output end of the conversion unit and the energy storage unit. The first unidirectional conduction unit includes at least one diode. The energy storage unit includes at least one capacitor, at least one supercapacitor, or at least one battery.

In an implementation, the first unidirectional conduction unit is connected in series between the input end of the conversion unit and the energy storage unit, the optimizer further includes a second unidirectional conduction unit, and the second unidirectional conduction unit is connected in series between the output end of the conversion unit and the energy storage unit, to improve an energy storage capability of the energy storage unit under different working statuses.

The second unidirectional conduction unit includes at least one diode.

In an implementation, an input end of the auxiliary power source is electrically connected to the input end of the conversion unit, or an input end of the auxiliary power source is electrically connected to an output end of the conversion unit; the first unidirectional conduction unit is connected in series between an output end of the auxiliary power source and the energy storage unit; and the energy storage unit is electrically connected to the control unit. In this way, when the optimizer performs the IV curve scanning task, the energy storage unit supplies power to the control unit, to improve capacity utilization of the energy storage unit. In addition, the auxiliary power source further shuts down a partial circuit that is not related to an IV curve scanning function, to reduce electric energy consumption and increase a power supply time of a circuit that is related to the IV curve.

According to a second aspect, an embodiment of this application discloses a photovoltaic power generation system, including a plurality of photovoltaic modules and an inverter. The photovoltaic power generation system further includes a plurality of optimizers described in the first aspect. An input end of each optimizer is connected to at least one photovoltaic module, and output ends of the plurality of optimizers are connected in series to form a string and then connected to the inverter.

In an implementation, when a plurality of optimizers in a same string perform IV curve scanning at the same time, a voltage segment for which at least one optimizer currently performs scanning is different from a voltage segment for which another optimizer currently performs scanning.

According to a third aspect, an embodiment of this application discloses an IV curve scanning method for a photovoltaic module, applied to a photovoltaic power generation system, where the photovoltaic power generation system includes a plurality of photovoltaic modules, and the IV curve scanning method for the photovoltaic module includes:

dividing a range of an output voltage of a photovoltaic module corresponding to the optimizer from an open-circuit voltage to a preset minimum voltage into at least two voltage segments; and when the optimizer needs to perform an IV curve scanning task, performing IV curve scanning for each voltage segment obtained through division.

In an implementation, the performing IV curve scanning for each voltage segment obtained through division specifically includes: when performing IV curve scanning for each voltage segment, adjusting the output voltage of the photovoltaic module to a voltage of one of two endpoints of the voltage segment.

In an implementation, there is an intersection between two adjacent voltage segments.

In an implementation, two endpoints of a voltage segment are respectively the open-circuit voltage and a threshold voltage of the photovoltaic module, and the voltage segment is a first voltage segment. The threshold voltage of the photovoltaic module is less than a minimum voltage needed by an auxiliary power source for working, and a range from the threshold voltage of the photovoltaic module to the preset minimum voltage is divided into at least two voltage segments.

In an implementation, the first voltage segment is divided into at least two voltage segments.

In an implementation, when a plurality of optimizers in a same string perform IV curve scanning at the same time, a voltage segment for which at least one optimizer currently performs scanning is different from a voltage segment for which another optimizer currently performs scanning.

According to a fourth aspect, an embodiment of this application discloses a computer readable storage medium, where the readable storage medium stores a program instruction for IV curve scanning, and the program instruction is used to perform the IV curve scanning method for a photovoltaic module according to the third aspect after being invoked.

BRIEF DESCRIPTION OF DRAWINGS

To describe the technical solutions in the embodiments of this application or in the background, the following briefly describes the accompanying drawings for describing the embodiments of this application or the background.

DESCRIPTION OF EMBODIMENTS

This application provides a photovoltaic power generation system, an optimizer applied to the photovoltaic power generation system, and an IV curve scanning method for a photovoltaic module. The optimizer performs IV curve scanning on the photovoltaic module, to detect whether the photovoltaic module has a defect or damage. The following describes the embodiments of this application with reference to accompanying drawings.

Figure 1:
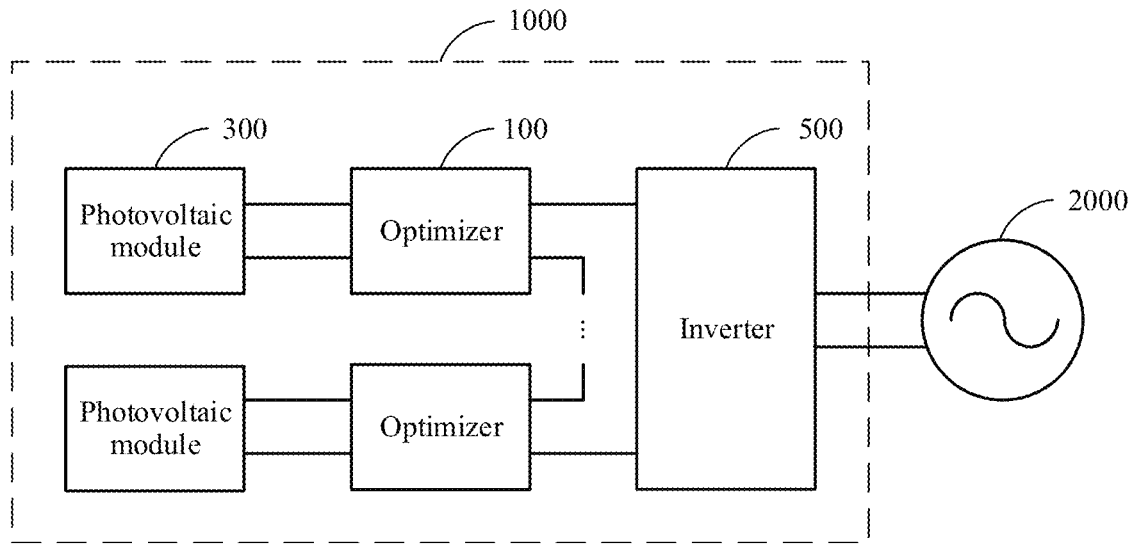
FIG. 1 is a schematic structural diagram of a photovoltaic power generation system according to an embodiment of this application.

FIG. 1 is a principle block diagram of a photovoltaic power generation system 1000 according to an embodiment of this application. As shown in FIG. 1, the photovoltaic power generation system 1000 includes a plurality of optimizers 100, a plurality of photovoltaic modules 300, and an inverter 500. The photovoltaic module 300 is configured to convert solar energy into electric energy. An input end of each optimizer 100 is connected to at least one photovoltaic module 300, and output ends of the plurality of optimizers 100 are connected in series to form a string and then connected to the inverter 500. In some embodiments, the photovoltaic power generation system 1000 includes a plurality of strings.

The optimizer 100 is configured to optimize an output power of the photovoltaic module 300 connected to the optimizer 100, to ensure that an output power of the photovoltaic power generation system 1000 is maximized. The optimizer 100 is further configured to perform IV curve scanning on the photovoltaic module 300 connected to the optimizer 100, to detect whether the photovoltaic module 300 connected to the optimizer 100 has a defect or damage. I refers to current, and V refers to voltage. In addition, an IV curve further indicates information such as a current power generation capability and working status of the photovoltaic module 300.

The inverter 500 is configured to convert a direct current output by the photovoltaic module 300 into an alternating current, and then output the alternating current to a power grid 2000. In another implementation, a combiner box (not shown in the figure) is further added between the optimizers 100 and the inverter 500, and an alternating current side of the inverter 500 is connected to a step-up transformer (not shown in the figure) and then connected to the power grid 2000. This is determined according to a specific application environment, and is not specifically limited herein.

In a specific implementation, the photovoltaic power generation system 1000 further includes a communications host (not shown in the figure), configured to communicate with the optimizer 100, to obtain an electric parameter of the optimizer 100 through communication. The communications host is an independent device, or is integrated into another device in the photovoltaic power generation system 1000, for example, integrated into the inverter 500, the combiner box, a grid-tied box, or one of the optimizers. The communications host communicates with the optimizer through wireless communication (such as Wi-Fi, Lora, or ZigBee) or PLC communication.

Figure 2:
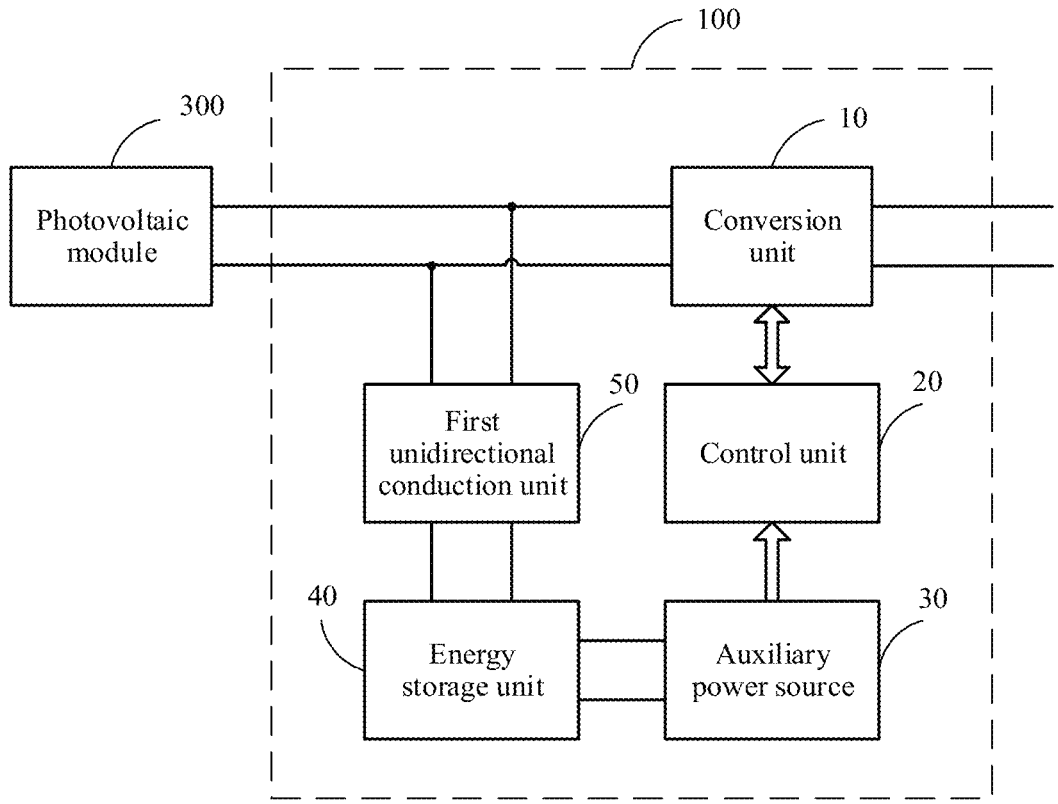
FIG. 2 is a principle block diagram of an optimizer according to an embodiment of this application.

Referring to FIG. 2, each optimizer 100 includes a conversion unit 10, a control unit 20, an auxiliary power source 30, an energy storage unit 40, and a first unidirectional conduction unit 50. An input end of the conversion unit 10 is connected to at least one photovoltaic module 300, and is used as an input end of the optimizer 100. An output end of the conversion unit is used as an output end of the optimizer 100, and output ends of the plurality of optimizers 100 are connected in series to form a string.

In a specific embodiment, the conversion unit 10 is a DC/DC conversion unit, and works in a power conversion mode, to perform power conversion on direct current electric energy of the photovoltaic module 300 at the input end, and then output converted direct current electric energy to the output end, or works in a pass-through mode, to directly connect the input end and the output end. In a specific actual application, circuit setting is performed on the DC/DC conversion unit according to a specific application environment, for example, a buck circuit, a boost circuit, a buck-boost circuit, or the like is set.

When working in the power conversion mode, the conversion unit 10 is mainly configured to perform maximum power point tracking (Maximum Power Point Tracking, MPPT) on the electric energy of the photovoltaic module 300 at the input end. In addition, the conversion unit 10 further works in a soft-start mode, a power-limiting mode, or the like. The slow-start, also referred to as soft-start, is used in a startup phase of the conversion unit 10, and the conversion unit 10 smoothly runs from a standby mode to the power conversion mode, for example, changes from the standby mode to a maximum power point current at a speed of an input current change rate: 0.2 A/s. The power-limiting mode is used to reduce an output power when a running status of the conversion unit 10 approaches a threshold value (for example, an output voltage reaches a threshold value or an ambient temperature reaches a threshold value), to protect the conversion unit 10, or reduce an output power after a power-limiting mode instruction delivered by an external device is received.

The control unit 20 is electrically connected to the conversion unit 10, and is configured to control the conversion unit 10. In addition, the control unit 20 is further configured to collect a working status parameter of the conversion unit 10. The working status parameter of the conversion unit 10 includes but is not limited to information such as an input voltage, an input current, an output voltage, and an output current of the conversion unit 10.

The auxiliary power source 30, the energy storage unit 40, and the first unidirectional conduction unit 50 are connected between the conversion unit 10 and the control unit 20.

In a specific implementation, as shown in FIG. 2, the auxiliary power source 30 is electrically connected to the control unit 20, and is configured to provide a working voltage for the control unit 20. In some embodiments, the auxiliary power source 30 is further configured to supply power to another functional circuit in the optimizer 100. In this implementation, the control unit 20 is a single-chip microcomputer. The control unit 20 includes a plurality of signal collection ports, a communications port, a plurality of control ports, and the like.

The energy storage unit 40 is connected in parallel to an input end of the auxiliary power source 30, and is configured to provide electric energy for the auxiliary power source 30. In a specific implementation, the energy storage unit 40 includes at least one energy storage capacitor, at least one supercapacitor, or at least one battery.

The first unidirectional conduction unit 50 is connected in series between the input end of the conversion unit 10 and the energy storage unit 40, to prevent the electric energy of the energy storage unit 40 from falling with a decrease of a voltage of the photovoltaic module 300 when the optimizer 100 performs IV curve scanning on the photovoltaic module 300. In a specific implementation, the first unidirectional conduction unit 50 includes at least one diode. For example, an anode of the diode is electrically connected to a positive electrode of the input end of the conversion unit 10, and a cathode of the diode is electrically connected to a positive electrode of the input end of the auxiliary power source 30. Alternatively, a cathode of the diode is electrically connected to a negative electrode of the input end of the conversion unit 10, and an anode of the diode is electrically connected to a negative electrode of the input end of the auxiliary power source 30. Alternatively, an anode of the diode is electrically connected to a positive electrode of the output end of the conversion unit 10, and a cathode of the diode is electrically connected to a positive electrode of the input end of the auxiliary power source 30. Alternatively, a cathode of the diode is electrically connected to a negative electrode of the output end of the conversion unit 10, and an anode of the diode is electrically connected to a negative electrode of the input end of the auxiliary power source 30.

In a specific implementation, the control unit 20 is configured to perform IV curve scanning for each voltage segment when determining that the optimizer 100 needs to perform an IV curve scanning task. The voltage segments are obtained by segmenting a range of an output voltage of the photovoltaic module 300 corresponding to the optimizer 100 from an open-circuit voltage to a preset minimum voltage, and at least two voltage segments are obtained through division. In other words, the range of the output voltage of the photovoltaic module 300 corresponding to the optimizer 100 from the open-circuit voltage to the preset minimum voltage is divided into N voltage segments. N is a positive integer greater than or equal to 2. The preset minimum voltage is 0 V, or is a value close to 0 V. This is not specifically limited herein.

In an implementation, when receiving an IV curve scanning instruction sent by a host computer (for example, the inverter), the control unit 20 determines that the optimizer 100 needs to perform the IV curve scanning task. In another implementation, the control unit 20 performs autonomous detection, and determine, when detecting that a current status of the optimizer 100 meets a preset status, that the optimizer 100 needs to perform the IV curve scanning task.

Specifically, in an implementation, when performing IV curve scanning for each voltage segment, the control unit 20 adjusts the output voltage of the photovoltaic module 300 to a voltage of one of two endpoints of the voltage segment by using the conversion unit 10.

In an implementation, to ensure continuity of IV curve scanning, there is an intersection between two adjacent voltage segments. In this way, entire and continuous IV curve scanning for the range from the open-circuit voltage to the preset minimum voltage is implemented.

It should be noted that when performing IV curve scanning for each voltage segment, the control unit 20 changes the output voltage of the photovoltaic module 300 from one endpoint (start point) of the voltage segment to the other endpoint (termination point) of the voltage segment by using the conversion unit 10 according to a preset regularity. A start voltage of each voltage segment is greater than a termination voltage, or a start voltage of each voltage segment is less than a termination voltage, or start voltages of some voltage segments are greater than termination voltages, and a start voltage of the other voltage segment is less than a termination voltage.

In an implementation, the preset regularity is at least one of a voltage decrease regularity of a fixed voltage difference, a voltage decrease regularity of a parabola, or a voltage decrease regularity of a fixed duty cycle change rate. The voltage decrease regularity of the parabola specifically means that a voltage decreases relatively quickly near the preset minimum voltage of the photovoltaic module, and a voltage decreases relatively slowly near a maximum power point voltage and the open-circuit voltage. The voltage decrease regularity of the fixed duty cycle change rate means that a control duty cycle of the optimizer 100 changes at a fixed step from an initial status. For example, the control duty cycle increases from 0 to 1 at a fixed step of 0.01.

Figure 3:
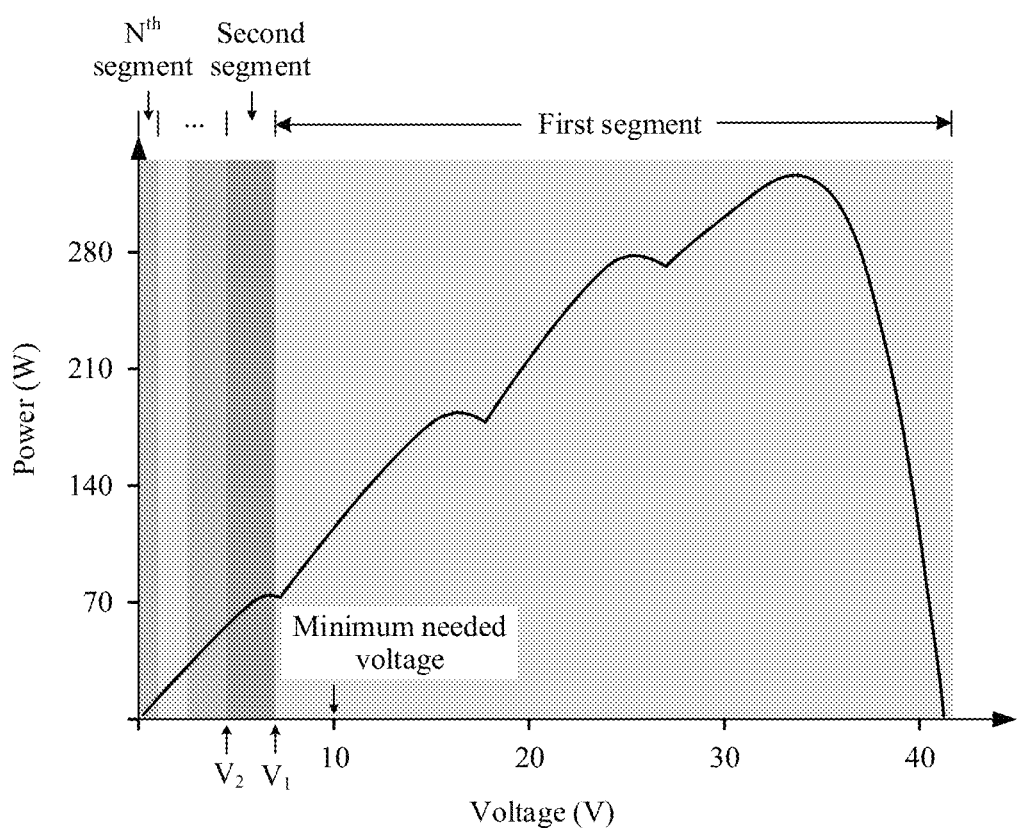
FIG. 3 is a schematic diagram of voltage segments of a photovoltaic module according to an embodiment of this application.

The following describes, in detail with reference to FIG. 3, a process in which the optimizer 100 performs IV curve scanning for each voltage segment.

As shown in FIG. 3, in an implementation, two endpoints of a voltage segment are respectively the open-circuit voltage and a threshold voltage V1 of the photovoltaic module 300, and the voltage segment is a first voltage segment. The threshold voltage of the photovoltaic module 300 is less than a minimum voltage needed by the auxiliary power source 30 for working, and a range from the threshold voltage to the preset minimum voltage is divided into at least two voltage segments. In this way, the entire IV curve scanning is implemented by using an energy storage unit having a relatively low capacity, to help to reduce a volume and costs of the optimizer.

Figure 5:
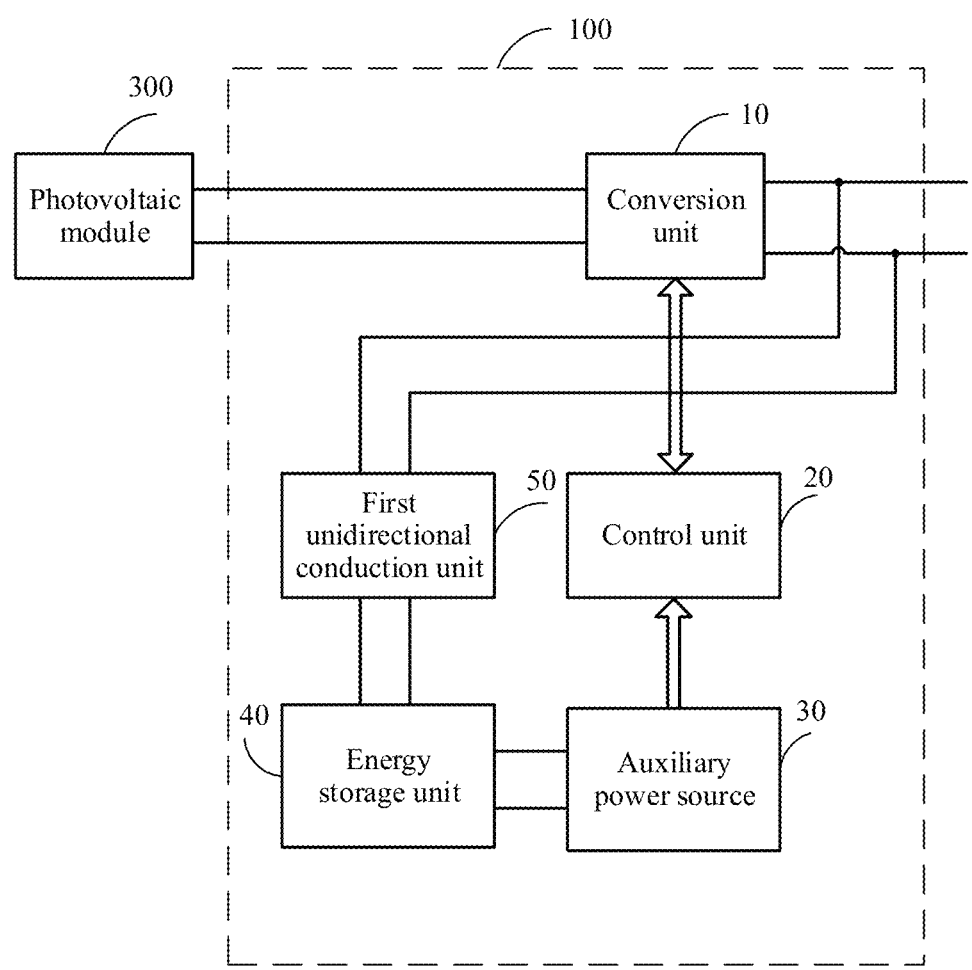
FIG. 5 is a principle block diagram of an optimizer according to another embodiment of this application.

It is understood that the working voltage of the auxiliary power source 30 is directly provided by the photovoltaic module 300, or is provided by the conversion unit 10 after the conversion unit 10 increases or decreases the output voltage of the photovoltaic module 300. Therefore, the minimum voltage needed by the auxiliary power source 30 for working is a minimum output voltage that is output by the photovoltaic module 300 and that ensures normal working of the auxiliary power source 30, and the minimum output voltage of the photovoltaic module 300 is directly provided for the auxiliary power source 30 (as shown in FIG. 2) for working of the auxiliary power source 30, or is converted (as shown in FIG. 5) and then provided for the auxiliary power source 30 for normal working of the auxiliary power source 30. That the threshold voltage of the photovoltaic module 300 is less than the minimum voltage needed by the auxiliary power source 30 for working means that a voltage difference between the threshold voltage of the photovoltaic module 300 and the minimum voltage needed by the auxiliary power source 30 for working falls within a preset range, and the preset range depends on energy that is provided by the energy storage unit 40. To be specific, the preset range is a voltage decrease range of the photovoltaic module 300 in a scenario in which the energy storage unit 40 continues to supply power when an output of the photovoltaic module 300 is less than the minimum output voltage that ensures normal working of the auxiliary power source 30.

When IV curve scanning is performed for a first segment of voltage, most of the time, the output voltage of the photovoltaic module 300 is greater than the minimum voltage needed by the auxiliary power source 30 for working. When the output voltage of the photovoltaic module 300 is less than the minimum voltage needed by the auxiliary power source 30 for working, the first unidirectional conduction unit 50 is forward cut off, and the energy storage unit 40 provides electric energy for the auxiliary power source 30. When the energy storage unit 40 has a relatively low capacity, the auxiliary power source 30 is undervoltage after a relatively short time, and the optimizer 100 stops working, and completes IV curve scanning for a voltage segment greater than or equal to the threshold voltage V1. The threshold voltage V1 is less than the minimum voltage needed by the auxiliary power source 30 for working. Then, the optimizer 100 is restarted, and controls the output voltage of the photovoltaic module 300 to rapidly decrease to the voltage V1 of one of two endpoints of a second segment, to perform IV curve scanning for the second voltage segment. In this case, the first unidirectional conduction unit 50 is forward cut off, the energy storage unit 40 provides electric energy for the auxiliary power source 30, and the optimizer 100 completes IV curve scanning for the second segment from the threshold voltage V1 to a value V2. V2 is less than V1. By analog, the process ends until IV curve scanning is completed for an $N^{th}$ segment greater than or equal to the preset minimum voltage. Therefore, the optimizer 100 completes an entire IV curve scanning task.

It is understood that when the optimizer 100 performs the IV curve scanning task on the connected photovoltaic module 300 and controls the output voltage of the photovoltaic module 300 to decrease, if the optimizer 100 does not include the first unidirectional conduction unit 50 and the energy storage unit 40, an input voltage of the auxiliary power source 30 decreases with a decrease of the output voltage of the photovoltaic module 300, and the auxiliary power source 30 stops working when the output voltage of the photovoltaic module 300 is less than the minimum voltage needed by the auxiliary power source 30 for working. As a result, the optimizer 100 cannot complete an IV curve scanning task for a voltage segment of a voltage of the output voltage of the photovoltaic module 300 less than the minimum voltage needed by the auxiliary power source 30 for working.

In this embodiment of this application, because the optimizer 100 includes the first unidirectional conduction unit 50 and the energy storage unit 40, when the optimizer 100 controls the output voltage of the photovoltaic module 300 to decrease to be less than the minimum voltage needed by the auxiliary power source 30 for working, the first unidirectional conduction unit 50 is forward cut off, to prevent electric energy of the energy storage unit 40 from falling with a decrease of the output voltage of the photovoltaic module 300. In addition, because the range of the output voltage of the photovoltaic module 300 from the threshold voltage to the preset minimum voltage is divided into at least two voltage segments, and the control unit 20 performs IV curve scanning for each voltage segment by using the energy storage unit 40 having a relatively small capacity, that the optimizer 100 completes an entire IV curve scanning task.

In the optimizer 100 in this embodiment of this application, when determining that the optimizer 100 needs to perform the IV curve scanning task, the control unit 20 performs IV curve scanning for each voltage segment. The voltage segments are obtained by segmenting the range of the output voltage of the photovoltaic module 300 corresponding to the optimizer 100 from the open-circuit voltage to the preset minimum voltage, and at least two voltage segments are obtained through division. The optimizer is restarted when IV curve scanning is performed for a voltage segment with a relatively low voltage, so that the energy storage unit 40 is recharged in this time period. In addition, the output voltage of the photovoltaic module 300 is adjusted to the current voltage segment. Therefore, the entire IV curve scanning task is completed by using the energy storage unit 40 having a relatively low capacity, thereby reducing costs and a volume of the optimizer 100.

Figure 4:
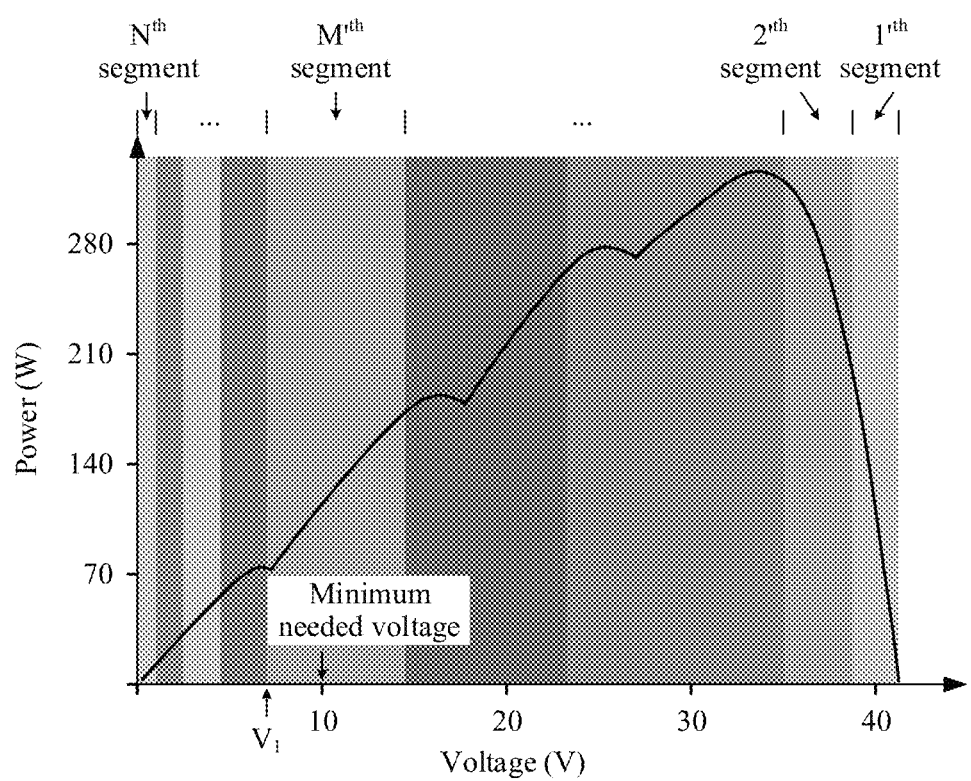
FIG. 4 is a schematic diagram of voltage segments of a photovoltaic module according to another embodiment of this application.

In an implementation, the first voltage segment is further divided into at least two voltage segments. Specifically, as shown in FIG. 4, the "first segment" in FIG. 3 is divided into a $1'^{th}$ segment, a $2'^{th}$ segment, ..., and an $M'^{th}$ segment, where M' is an integer greater than or equal to 2. When performing the IV curve scanning task, the optimizer 100 performs IV curve scanning for the $1'^{th}$ segment, the $2'^{th}$ segment, ..., the $N'^{th}$ segment.

In this implementation, when a plurality of optimizers 100 in a same string perform IV curve scanning at the same time, a voltage segment for which at least one optimizer 100 currently performs scanning is different from a voltage segment for which the other optimizer 100 currently performs scanning. In this way, a fluctuation of a final total output power of the string is relatively small.

Generally, each optimizer 100 is connected to a same quantity of photovoltaic modules 300 with same or similar characteristics, and a plurality of optimizers 100 are connected in series to form a string. If optimizers 100 in a same string perform IV curve scanning at the same time, and the optimizers 100 use a same single-segment IV curve scanning method to control the output voltage of the photovoltaic module 300, a total output power curve of the string is approximately a multiple of a power curve in FIG. 4, a total output power fluctuates greatly, and this affects normal working of a next circuit.

In this embodiment of this application, each optimizer 100 separately segments an output voltage of a corresponding photovoltaic module 300, and the segments are the same or different. The segments are different when the optimizers 100 are connected to different quantities of photovoltaic modules 300 or connected to photovoltaic modules 300 with different characteristics. When optimizers 100 in a same string perform IV curve scanning at the same time, at a moment, an optimizer 100 performs IV curve scanning for a first segment, another optimizer 100 performs IV curve scanning for a second segment, still another optimizer 100 performs IV curve scanning for a third segment, and so on. The first segment, the second segment, the third segment, ..., and the $N^{th}$ segment is the same or different. In this embodiment of this application, that two voltage segments are a same voltage segment is as follows: voltages of endpoints of the two voltage segments are the same. If voltage segments for which the optimizers 100 perform IV curve scanning are relatively evenly distributed in the entire range from the open-circuit voltage to the preset minimum voltage at this moment, for example, the first segment is 25 V to 33 V, the second segment is 20 V to 29 V, the third segment is 15 V to 25 V, and so on, output powers of the optimizers 100 are also relatively evenly distributed in an entire range from a maximum power point to a zero power point. At a subsequent moment, because segments for which the optimizers 100 perform IV curve scanning are still evenly distributed, output powers of the optimizers 100 are also evenly distributed, so that a fluctuation of a final total output power of the string is relatively small.

It should be noted that in this embodiment of this application, the output voltage of the photovoltaic module 300 is relatively flexibly segmented. A voltage range greater than the threshold voltage V1 is divided into several segments rather than one segment. A reason is as follows: This voltage range is relatively large and a corresponding power range is also relatively large, more voltage segments correspond to more power segments, and this facilitates segment selection, to reduce a fluctuation of a total output power. To be specific, when optimizers 100 in a same string perform IV curve scanning at the same time, at an initial moment, segments of the optimizers 100 are selected based on an even distribution, so that a fluctuation of a total output power of the string decreases more obviously.

Referring to FIG. 5, in an implementation, different from the optimizer 100 in FIG. 2, the first unidirectional conduction unit 50 is connected in series between the output end of the conversion unit 10 and the energy storage unit 40. In this implementation, the working voltage of the auxiliary power source 30 is provided by the conversion unit 10 after the conversion unit 10 converts the output voltage of the photovoltaic module 300. The first unidirectional conduction unit 50 includes at least one diode.

Figure 6:
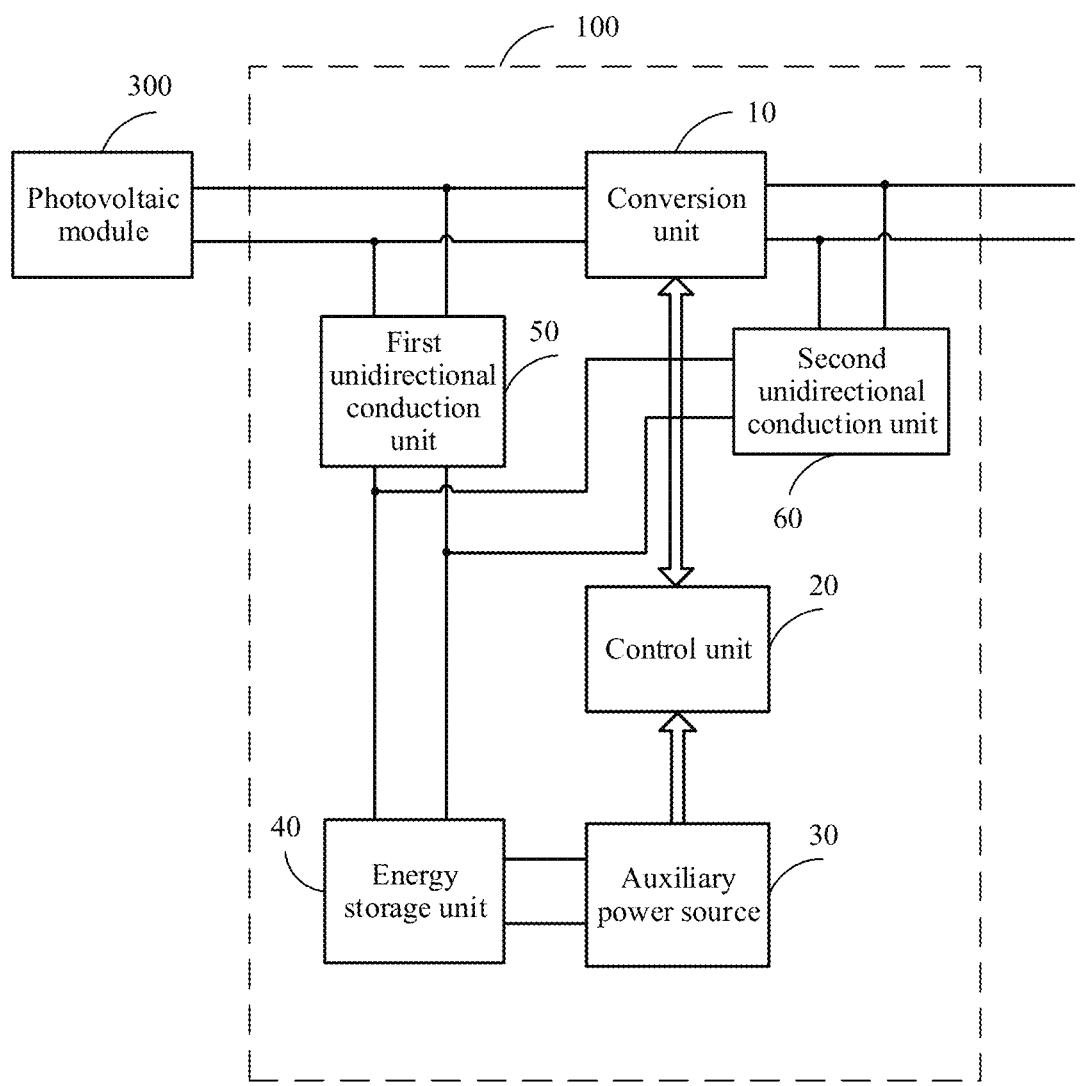
FIG. 6 is a principle block diagram of an optimizer according to still another embodiment of this application.

Referring to FIG. 6, in an implementation, different from the optimizer 100 in FIG. 2, each optimizer 100 further includes a second unidirectional conduction unit 60, and the second unidirectional conduction unit 60 is connected in series between the output end of the conversion unit 10 and the energy storage unit 40. In this way, an energy storage capability of the energy storage unit 40 under different working statuses is improved.

Specifically, the second unidirectional conduction unit 60 includes at least one diode.

Figure 7:
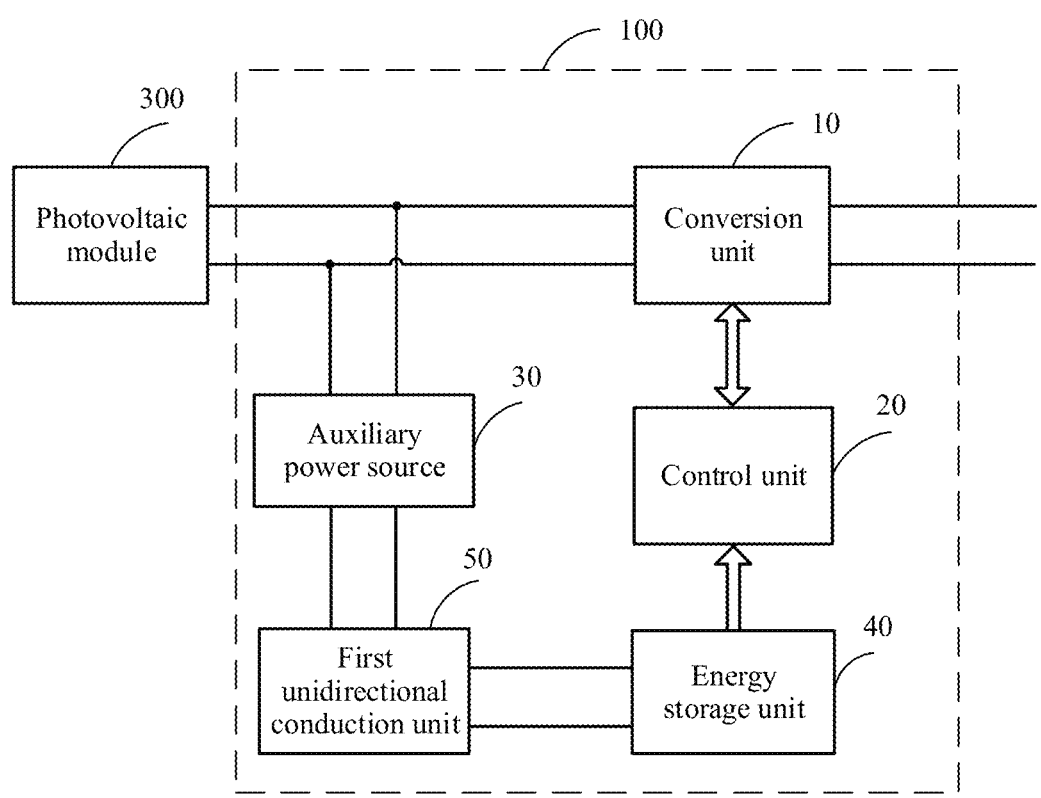
FIG. 7 is a principle block diagram of an optimizer according to yet another embodiment of this application.
Figure 8:
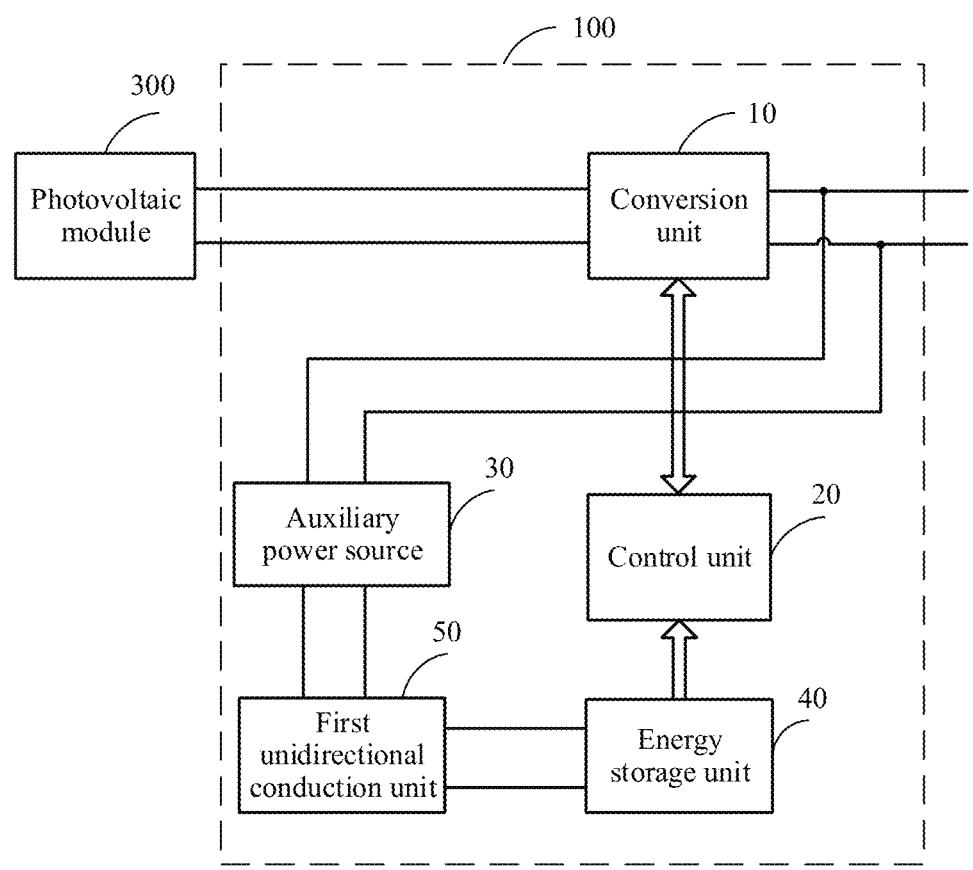
FIG. 8 is a principle block diagram of an optimizer according to yet another embodiment of this application.

Referring to FIG. 7 and FIG. 8, in an implementation, the input end of the auxiliary power source 30 is electrically connected to the input end of the conversion unit 10, or the input end of the auxiliary power source 30 is electrically connected to the output end of the conversion unit 10. The first unidirectional conduction unit 50 is connected in series between an output end of the auxiliary power source 30 and the energy storage unit 40, and the energy storage unit 40 is electrically connected to the control unit 20. In this implementation, when the optimizer 100 performs the IV curve scanning task, the energy storage unit 40 supplies power to the control unit 20, to improve capacity utilization of the energy storage unit 40. In addition, the auxiliary power source 30 further shuts down a partial circuit that is not related to an IV curve scanning function, to reduce electric energy consumption and increase a power supply time of a circuit that is related to the IV curve.

Figure 9:
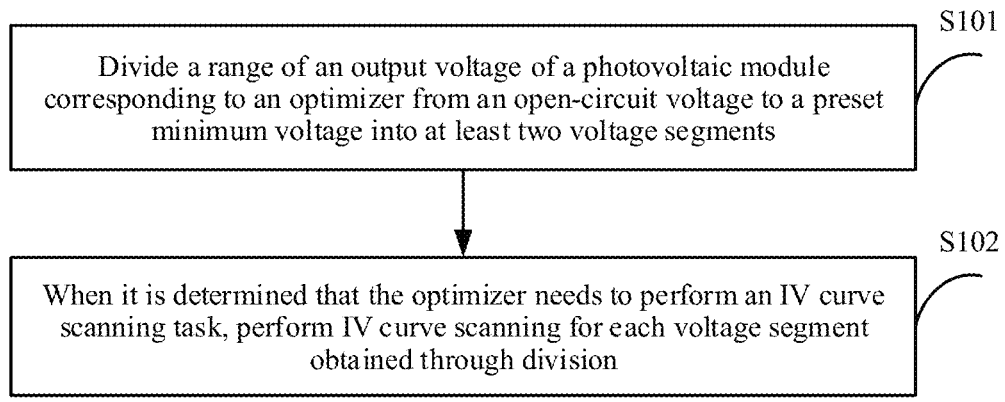
FIG. 9 is a flowchart of an IV curve scanning method for a photovoltaic module according to an embodiment of this application.

Referring to FIG. 9, this application further provides an IV curve scanning method for a photovoltaic module. The IV curve scanning method for a photovoltaic module is applied to the photovoltaic power generation system 1000 in FIG. 1. The IV curve scanning method for a photovoltaic module includes the following steps.

Step S101. Divide a range of an output voltage of a photovoltaic module corresponding to the optimizer from an open-circuit voltage to a preset minimum voltage into at least two voltage segments.

In an implementation, the optimizer 100 divides the range of the output voltage of the corresponding photovoltaic module from the open-circuit voltage to the preset minimum voltage into at least two voltage segments. In another implementation, a host computer (for example, the inverter 500) divides the range of the output voltage of the photovoltaic module 300 corresponding to the optimizer 100 from the open-circuit voltage to the preset minimum voltage into at least two voltage segments. This is not specifically limited herein.

Step S102. When a determination is made that the optimizer needs to perform an IV curve scanning task, perform IV curve scanning for each voltage segment obtained through division.

In an implementation, when receiving an IV curve scanning instruction sent by the host computer (for example, the inverter), the control unit 20 determines that the optimizer 100 needs to perform the IV curve scanning task. In another implementation, the control unit 20 performs autonomous detection, and determine, when detecting that a current status of the optimizer 100 meets a preset status, that the optimizer 100 needs to perform the IV curve scanning task.

Specifically, in an implementation, the performing IV curve scanning for each voltage segment obtained through division specifically includes: when performing IV curve scanning for each voltage segment, adjusting the output voltage of the photovoltaic module 300 to a voltage of one of two endpoints of the voltage segment.

In an implementation, to ensure continuity of IV curve scanning, there is an intersection between two adjacent voltage segments.

It should be noted that when performing IV curve scanning for each voltage segment, the control unit 20 changes the output voltage of the photovoltaic module 300 from one endpoint (start point) of the voltage segment to the other endpoint (termination point) of the voltage segment by using the conversion unit 10 according to a preset regularity. A start voltage of each voltage segment is greater than a termination voltage, or a start voltage of each voltage segment is less than a termination voltage, or start voltages of some voltage segments are greater than termination voltages, and a start voltage of the other voltage segment is less than a termination voltage.

In a specific implementation, the preset regularity is at least one of a voltage decrease regularity of a fixed voltage difference, a voltage decrease regularity of a parabola, or a voltage decrease regularity of a fixed duty cycle change rate.

In an implementation, two endpoints of a voltage segment are respectively the open-circuit voltage and a threshold voltage V1 of the photovoltaic module 300, and the voltage segment is a first voltage segment. The threshold voltage of the photovoltaic module 300 is less than a minimum voltage needed by the auxiliary power source 30 for working, and a range from the threshold voltage of the photovoltaic module 300 to the preset minimum voltage is divided into at least two voltage segments. In some embodiments, the threshold voltage of the photovoltaic module 300 is less than the minimum voltage needed by the auxiliary power source 30 for working means that a voltage difference between the threshold voltage of the photovoltaic module 300 and the minimum voltage needed by the auxiliary power source 30 for working falls within a preset range, and the preset range depends on energy that is provided by the energy storage unit 40. To be specific, the preset range is a voltage decrease range of the photovoltaic module 300 in a scenario in which the energy storage unit 40 continues to supply power when an output of the photovoltaic module 300 is less than the minimum voltage that ensures normal working of the auxiliary power source 30.

In some implementations, the first voltage segment is further divided into at least two voltage segments. When a plurality of optimizers 100 in a same string perform IV curve scanning at the same time, a voltage segment for which at least one optimizer 100 currently performs scanning is different from a voltage segment for which the other optimizer 100 currently performs scanning.

The embodiments in this specification are described in a progressive manner, for same or similar parts in the embodiments, reference is made to these embodiments, and each embodiment focuses on a difference from other embodiments. The method disclosed in the embodiments is described relatively simply because the method corresponds to the apparatus disclosed in the embodiments, and for a related part, refer to the description of the apparatus.

It should be noted that, for brief description, the foregoing method embodiments are represented as a series of actions. However, a person skilled in the art should appreciate that this application is not limited to the described order of the actions, because according to this application, some steps is performed in other orders or simultaneously.

A sequence of the steps of the method in the embodiments of this application may be adjusted, combined, or removed.

The IV curve scanning method for a photovoltaic module provided in this application is implemented in hardware and firmware, or is used as software or computer code that is stored in a computer readable storage medium such as a read-only memory (Read-Only Memory, ROM), a random access memory (Random Access Memory, RAM for short), a floppy disk, a hard disk, or a magneto-optical disk, or is used as computer code that is originally stored in a remote recording medium or a non-transitory machine-readable medium and that is downloaded over a network and stored in a local recording medium. Therefore, the method described herein is presented by using software stored in a recording medium, in a general-purpose computer, a special processor, or programmable or dedicated hardware such as an application-specific integrated circuit (ASIC) or a field programmable gate array (FPGA). As can be understood in the art, a computer, a processor, a microprocessor, a controller, or programmable hardware includes a memory component such as a RAM, a ROM, or a flash memory. When a computer, a processor, or hardware accesses and executes software or computer code to implement the processing method described herein, the memory component stores or receive the software or the computer code. Further, when the general-purpose computer accesses code for implementing the processing shown herein, execution of the code converts the general-purpose computer to a special-purpose computer used to perform the processing shown herein.

The computer readable storage medium is a solid-state memory, a memory card, an optical disc, or the like. The computer readable storage medium stores a program instruction, and the program instruction is invoked by the optimizer in this application to perform the foregoing IV curve scanning method for a photovoltaic module.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optimizer, comprising:
   a conversion unit;
   a photovoltaic module, wherein an input end of the conversion unit is configured to be connected to one or more photovoltaic modules and perform power conversion on a connected photovoltaic module;
   a control unit, configured to control the conversion unit; and
   an auxiliary power source, wherein the auxiliary power source is configured to provide a working voltage for the control unit;
   an energy storage unit, wherein the energy storage unit is configured to provide electric energy for the auxiliary power source or the control unit; and
   a first unidirectional conduction unit, wherein the first unidirectional conduction unit, the energy storage unit, and the auxiliary power source are electrically connected between the conversion unit and the control unit and the first unidirectional conduction unit is configured to prevent the electric energy of the energy storage unit from falling with a decrease of a voltage of the photovoltaic module,
   wherein the control unit is further configured to perform current-voltage IV curve scans for voltage segments, wherein the voltage segments are in a range of an output voltage of the photovoltaic module from an open-circuit voltage to a preset minimum voltage, and there are at least two voltage segments, wherein
   a first width of a first voltage segment of the voltage segments along a voltage axis of the IV curve is different from a second width of a second voltage segment of the voltage segments along the voltage axis of the IV curve.

2. The optimizer according to claim 1, wherein in response to the current-voltage IV curve scans for each voltage segment, the control unit is configured to adjust the output voltage of the photovoltaic module to a voltage of one of two endpoints of a voltage segment.

3. The optimizer according to claim 1, wherein there is an intersection between two adjacent voltage segments.

4. The optimizer according to claim 1, wherein two endpoints of a first voltage segment of the voltage segments are respectively the open-circuit voltage and a threshold voltage of the photovoltaic module, wherein the threshold voltage of the photovoltaic module is less than a minimum voltage needed by the auxiliary power source for working, and a range from the threshold voltage of the photovoltaic module to the preset minimum voltage is divided into at least two voltage segments.

5. The optimizer according to claim 4, wherein the first voltage segment is divided into at least two voltage segments.

6. The optimizer according to claim 1, wherein the auxiliary power source is electrically connected to the control unit, and the energy storage unit is connected in parallel to an input end of the auxiliary power source; and the first unidirectional conduction unit is connected in series between the input end of the conversion unit and the energy storage unit, or the first unidirectional conduction unit is connected in series between an output end of the conversion unit and the energy storage unit.

7. The optimizer according to claim 6, wherein the optimizer further comprises:
a second unidirectional conduction unit, wherein the first unidirectional conduction unit is connected in series between the input end of the conversion unit and the energy storage unit, and the second unidirectional conduction unit is connected in series between the output end of the conversion unit and the energy storage unit.

8. The optimizer according to claim 6, wherein the first unidirectional conduction unit comprises:
at least one diode.

9. The optimizer according to claim 6, wherein the energy storage unit comprises:
at least one capacitor, or at least one supercapacitor, or at least one battery.

10. The optimizer according to claim 1, wherein an input end of the auxiliary power source is electrically connected to the input end of the conversion unit, or the input end of the auxiliary power source is electrically connected to an output end of the conversion unit; the first unidirectional conduction unit is connected in series between an output end of the auxiliary power source and the energy storage unit; and
the energy storage unit is electrically connected to the control unit.

11. A photovoltaic power generation system, comprising:
a plurality of photovoltaic modules;
an inverter;
a plurality of optimizers, one or more optimizers comprising:
a conversion unit, wherein an input end of the conversion unit is configured to be connected to at least one photovoltaic module, and perform power conversion on a connected photovoltaic module;
a control unit, configured to control the conversion unit; and
an auxiliary power source, wherein the auxiliary power source is configured to provide a working voltage for the control unit;
an energy storage unit, the energy storage unit is configured to provide electric energy for the auxiliary power source or the control unit; and
a first unidirectional conduction unit, wherein the first unidirectional conduction unit, the auxiliary power source and the energy storage unit are electrically connected between the conversion unit and the control unit and the first unidirectional conduction unit is configured to prevent the electric energy of the energy storage unit from falling in response to a decrease of a voltage of the plurality of photovoltaic modules;
wherein the control unit is further configured to perform current-voltage IV curve scans for voltage segments, wherein the voltage segments are obtained by segmenting a range of an output voltage of the plurality of photovoltaic modules corresponding to the plurality of optimizers from an open-circuit voltage to a preset minimum voltage, and at least two voltage segments are obtained through division;
an input end of each optimizer is connected to at least one photovoltaic module; and
output ends of the plurality of optimizers are connected in series to form a string and then connected to the inverter, wherein
a first width of a first voltage segment of the voltage segments along a voltage axis of the IV curve is different from a second width of a second voltage segment of the voltage segments along the voltage axis of the IV curve.

12. The photovoltaic power generation system according to claim 11, wherein responsive to the plurality of optimizers in a same string performing current-voltage IV curve scans at the same time, a voltage segment for which at least one optimizer currently performs scanning is different from a voltage segment for which another optimizer currently performs scanning.

13. An IV curve scanning method for a photovoltaic module, applied to a photovoltaic power generation system, wherein the photovoltaic power generation system comprises:
a plurality of photovoltaic modules, and the IV curve scanning method for the photovoltaic module comprises:
dividing a range of an output voltage of the photovoltaic module corresponding to an optimizer from an open-circuit voltage to a preset minimum voltage into at least two voltage segments, wherein a first width of a first voltage segment of the voltage segments along a voltage axis of the IV curve is different from a second width of a second voltage segment of the voltage segments along the voltage axis of the IV curve; and
performing current-voltage IV curve scanning for each voltage segment obtained through the division.

14. The IV curve scanning method according to claim 13, wherein the performing the current-voltage IV curve scanning for each voltage segment obtained through the division comprises:
responsive to the performing the current-voltage IV curve scanning for each voltage segment, adjusting the output voltage of the photovoltaic module to a voltage of one of two endpoints of the voltage segment.

15. The IV curve scanning method according to claim 13, further comprising:
determining there is an intersection between two adjacent voltage segments.

16. The IV curve scanning method according to claim 13, further comprising:
determining two endpoints of a first voltage segment of the voltage segments obtained through division are respectively the open-circuit voltage and a threshold voltage of the photovoltaic module, wherein the threshold voltage of the photovoltaic module is less than a minimum voltage needed by an auxiliary power source for working, and a range from the threshold voltage of the photovoltaic module to the preset minimum voltage is divided into at least two range voltage segments.

17. The IV curve scanning method according to claim 16, further comprising:
dividing the first voltage segment into at least two first voltage segments.

18. The IV curve scanning method according to claim 13, further comprising:
responsive to a plurality of optimizers in a same string performing IV curve scanning at the same time, performing current-voltage IV curve scanning with a first optimizer on a first voltage segment; and performing current-voltage IV curve scanning with a second optimizer on a second voltage segment.

* * * * *